(No Model.) 3 Sheets—Sheet 1.
C. O. & E. C. MOORE & T. J. FITZSIMMONS.
MACHINE FOR SETTING PLANTS.
No. 510,925. Patented Dec. 19, 1893.
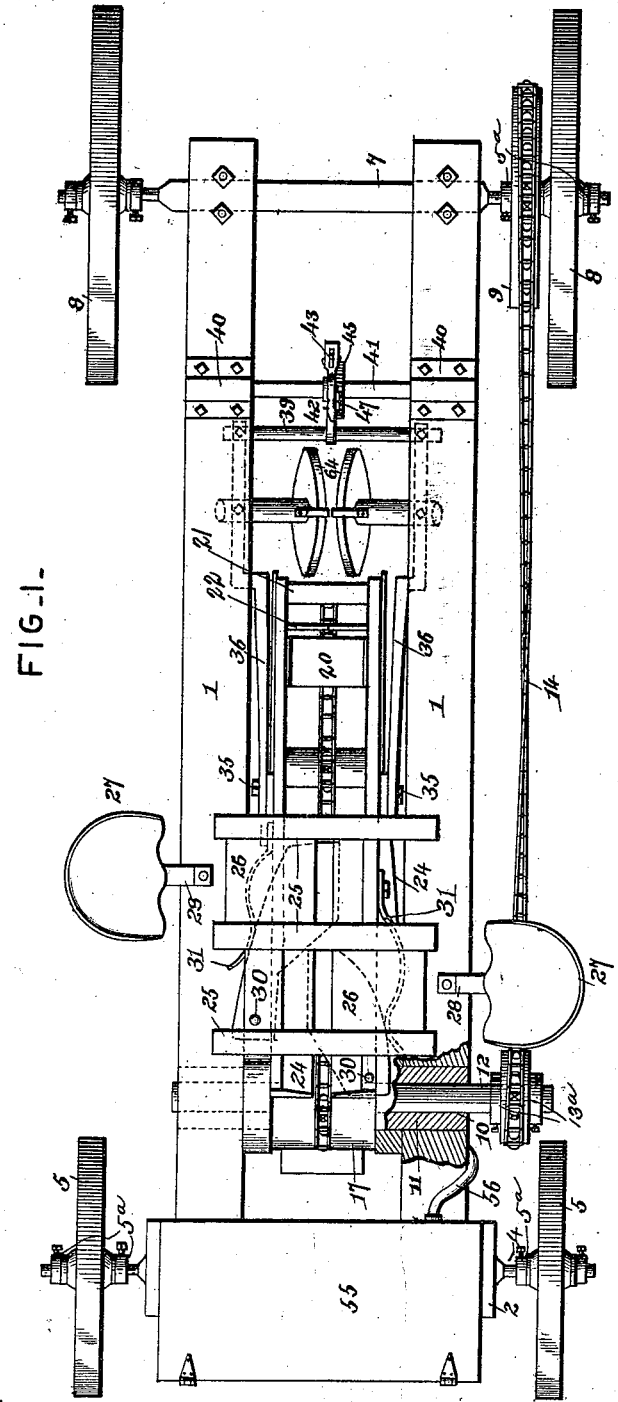
Witnesses
Jas. K. McCathran
W. S. Duvall
Inventors
Chester O. Moore
Edson C. Moore
Thomas J. Fitzsimmons
By their Attorneys,
C. A. Snow & Co.

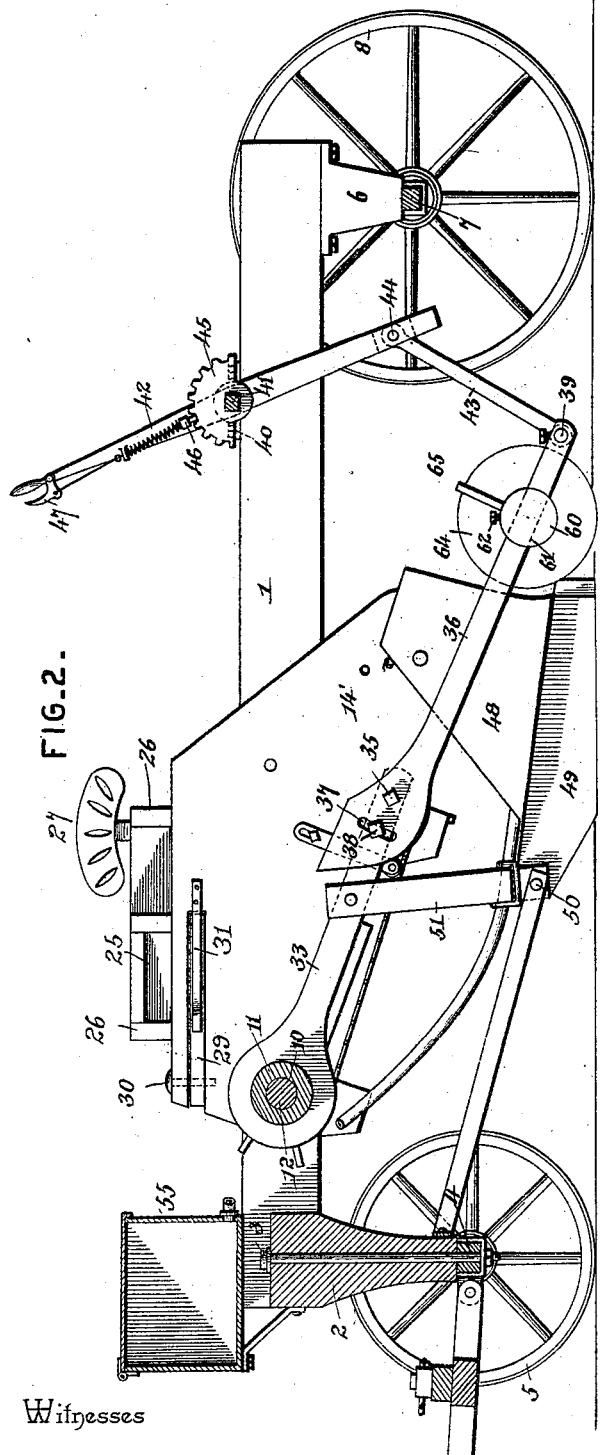

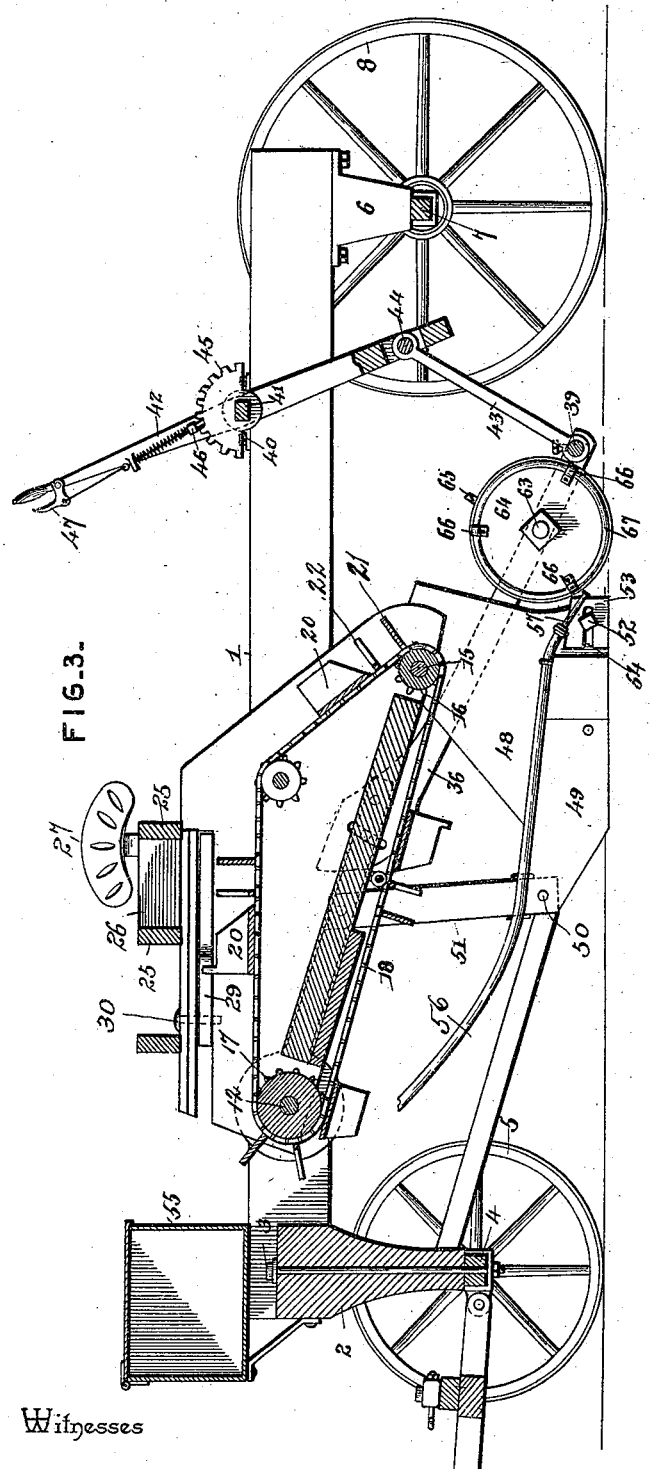

UNITED STATES PATENT OFFICE.

CHESTER O. MOORE, EDSON C. MOORE, AND THOMAS J. FITZSIMMONS, OF FRUITLAND, IOWA.

MACHINE FOR SETTING PLANTS.

SPECIFICATION forming part of Letters Patent No. 510,925, dated December 19, 1893.

Application filed April 19, 1893. Serial No. 471,053. (No model.)

*To all whom it may concern:*

Be it known that we, CHESTER O. MOORE, EDSON C. MOORE, and THOMAS J. FITZSIMMONS, citizens of the United States, residing at Fruitland, in the county of Muscatine and State of Iowa, have invented a new and useful Machine for Setting Plants, of which the following is a specification.

Our invention relates to improvements in transplanting machines, or in other words, to that class of machines employed to set out plants of various kinds, more especially sweet-potatoes, though as will hereinafter appear, the machine is applicable for use in setting out various kinds of plants aside from the sweet-potato plant.

The objects of our invention are to provide a machine into which the plants may be fed by hand and which will successively deposit the plants in a furrow formed by the machine, moisten or water the plants, and pack the dirt therearound, all in one continuous operation; furthermore, to provide means for regulating the depth of planting; and to construct the machine in a cheap and simple manner.

With these and other objects in view the invention consists in certain features of construction hereinafter specified and particularly pointed out in the claims.

Referring to the drawings:—Figure 1 is a plan view of a machine embodying our invention. Fig. 2 is a vertical longitudinal sectional view, the conveyer, shovel and adjacent parts being shown in side elevation. Fig. 3 is a central vertical longitudinal sectional view. Fig. 4 is a detail of one of the cut-offs. Fig. 5 is a similar view of one of the cups or flights. Fig. 6 is a detail of the shovel. Fig. 7 is a longitudinal section of one of the hoppers. Fig. 8 is a sectional view of one of the planting wheels and its support.

Like numerals of reference indicate like parts in all the figures of the drawings.

In practicing our invention we employ a pair of opposite side-sills 1, mounting the front ends of the same on a bolster 2, which is connected pivotally by means of a king-bolt 3 to the front axle 4, the latter terminating in elongated or extended spindles and provided with ground-wheels 5. The front axle is provided with the usual draft-mechanism. Depending bearings 6 are at the rear ends of the sills 1, and the same accommodate an axle 7, also having extended spindles, upon which are mounted ground-wheels 8, one being provided at its inner side with a sprocket-wheel 9 through which the power is transmitted to the mechanism hereinafter described. At each side of the hub of each ground-wheel an adjusting collar $5^a$ is mounted, and a set-screw is located therein, whereby the wheels may be adjusted. The opposite sills 1 are provided near their front ends with circular openings 10, and in the same are located metal bushings 11, whose inner ends project beyond the inner sides of said sills. In said bushings there is loosely journaled a transverse shaft 12, and the same is provided at one end with a sprocket-wheel 13 which is connected to the main drive sprocket-wheel 9 through the medium of a crossed chain-belt 14, and is adjustable by means of collars $13^a$ and set-screws, so that it may be maintained in alignment with the sprocket-wheel 9. Between the inner ends of the bushings just mentioned and upon the shaft 12 there is loosely mounted the opposite sides or guide-walls 14' of an inclined conveyer, the same being provided at its lower end with a transverse shaft 15, upon which is mounted a small sprocket-wheel 16. A larger sprocket-wheel 17, is located upon the shaft 12 between the sides of the conveyer, and the two sprocket-wheels are connected by means of a chain-belt 18.

At intervals there are secured plant-carrying cups, and each cup consists of an upper immovable or permanent section 20, a lower swinging foot-section 21, and an intermediate supporting section 22, the latter two being each secured to a link of the chain, and the permanent section being secured to several links, and at opposite sides provided with side flanges. The permanent section of each plant-receiving cup has one corner provided with a trip-pin 23, and these trip-pins are arranged at alternately opposite sides, their functions being hereinafter explained. A pair of inclined bars 24, is supported above the conveyer at the upper end thereof. The said bars being convergent toward their inner edges and terminating short of each other, produce an intermediate space through which in a manner hereinafter apparent, the plants may be fed to the cups below. The inclined bars 24 are traversed or intersected upon their upper sides by cross-bars 25, and the opposite ends of the cross-bars have inclined feed-boards 26, which form a continuity of surface in connection with that inclined bar 24 adjacent to which it is located, so that plants fed by hand will slide down the boards 26 to the slot between the bars 24.

For the purpose of accommodating the operators or feeders suitable seats 27 may be located at opposite sides of the machine and supported upon standards 28 that extend from the side sills 1.

Between the bars 24 and the upper edges of the sides of the conveyer spaces are produced, and in these spaces, which occur at opposite sides of the conveyer, a pair of cut-offs 29 are pivoted, as indicated at 30. Springs 31, are secured to the opposite sides of the conveyer, bear against the outer sides of the cut-offs, and serve to normally press the same inward and under the slot between the bars 24. It will be seen from this that the bars 24 and 25 and board 26 all combine to constitute a pair of hoppers whose bottoms are produced by the pivoted cut-offs 29. The cut-offs 29 are provided upon their inner sides with inclined edges 32, and by means of the trip-pins carried by the cups it will be obvious that first one cut-off and then the other will be operated or opened against the tension of its spring.

Loosely mounted upon the inner ends of the bushings 11 is a pair of shoulder-bars 33. The shoulder-bars extend parallel with the conveyer to a point near the lower end of the same, where they terminate and are pivoted by means of bolts 35, to a pair of extension-bars 36. The upper ends of the extension-bars are flared, as shown, and concentrically with the pivots 35 are provided with curved slots 37 through which and into the shoulder-bars pass screws 38, said screws and bolts passing into the guide-walls 14'. It will be seen that the extension-bars 36 may be raised and lowered at their lower ends, being limited in such movements merely by the length of the slots 37, and may be secured at any angle by means of the set-screws 38 above mentioned. The lower ends of the bars 36 are flared, as shown, are perforated at their extremities, and receive a cross-rung 39, the binding-screws passing through the extension-bars and impinging upon the cross-rung so as to adjust the bars together or away from each other to a limited extent.

Above the rear ends of the extension-bars there are located upon the sills 1 bearings 40, in which a shaft 41 is secured. The intermediate portion of the shaft is rounded and a hand-lever 42 is loosely hung upon the shaft at its rounded portion. The lower end of the hand-lever 42 is pivotally connected, as at 44, to the upper end of a link 43 whose lower end is perforated to loosely receive the cross-rung 39 before described.

A toothed locking-standard 45, is mounted upon the squared portion of the shaft 41 at one side of the cylindrical bearing-portion thereof, and mounted loosely in a bearing carried by the lever 42 is a bolt 46, which by means of a bell-crank lever 47 may be withdrawn from engagement with the toothed locking-standard, said bolt being normally in engagement with the teeth of said standard by means of a spring encircling the bolt. It will be seen that by means of the hand-lever, which is within easy reach of the driver, the conveyer and all parts mentioned and to be mentioned as connected therewith may be elevated or depressed so that the machine is thrown out of operation, or, as will hereinafter appear, made to set the plants deeper in accordance with the movement of the lever.

A pair of metal side-plates 48 are connected to the outer sides and at the lower ends of the conveyer, and to these side-plates there is adjustably secured by means of bolts passed through perforations therein a pair of shovel-sections 49. These shovel-sections 49 extend under and in rear of the conveyer and are angular in cross-section, said sections converging toward their ends, where they are pivotally connected, as at 50, to a depending stirrup 51. The stirrup is of U-shape and has its upper ends pivotally connected to the sides of the conveyer. The lower edges of the shovel-sections diverge toward their rear ends and by means of bolts 52 are connected to extension-plates 53, which plates extend from the rear ends of the shovel-sections and are slotted, as at 54, for the reception of the bolts.

A water-tank 55 surmounts the front ends of the sills 1, and a pipe 56 leads from the tank under the sills to the front end of the shovel and between the same where it terminates in a nozzle 57 adapted to discharge water upon the plant as the same is set in the ground and also into the bottom of the furrow formed by the shovel.

A pair of boxes 60 have circular openings 61 and are mounted upon the cylindrical portions of the extension-bars 36 immediately in rear of the shovel. These boxes are adjustable upon the extension-bars through the medium of binding-screws 62 which pass through the boxes and impinge upon the extension-bars. The inner ends of the boxes are provided with spindles 63 for the accommodation of setting the packing-wheels 64. Scraper-blades 65 extend from the boxes over the rims of the packing-wheels and serve to prevent the accumulation of soil. The inner faces of the packing-wheels are provided with brackets 66 which are annularly arranged, and each set of brackets has secured thereto a wire-ring 67, the same being designed to receive and embrace the plant.

The packing-wheels are directly in transverse alignment, but converge toward their upper edges, the object of the same being apparent in the following description of the operation of the machine. The plants being successively deposited in the manner heretofore described into the cups as the latter pass thereunder for their reception, are carried to the lower end of the conveyer where they are dropped by the advance foot-board section of the cup upon the rear end of the shovel, and from thence are deposited at regular intervals in the furrow. In this manner the wheels are brought into engagement with the plant, embracing the same at opposite sides and traveling in the furrow, the wheels holding the plant upright while pressing the soil therearound. The furrow of course is formed by the shovel sections, whose convergent sides gradually widen the furrow and thus adapt it for the plant. The bottom of the furrow, it will be seen, is thoroughly supplied with water from the supply-tank, as are also the roots of the plants.

From the foregoing description, in connection with the accompanying drawings, it will be seen that we have provided a machine of simple and economical construction adapted to receive plants of various kinds and successively deposit them in the bottom of a furrow formed by the machine, all without injury to the plant, which machine will supply the furrow as well as the roots of the plant with water, thus reviving the plant and at the same time covering the roots or returning the soil to the furrow, thus forming a ridge which at intervals will have the plants set therein.

All the parts, it will be observed, are adjustable and under the control of the operator; the furrow may be increased in depth by a simple movement of the hand-lever; and the other parts carried by the conveyer will be correspondingly adjusted.

The ground-wheels, it will be observed, are adapted to be set at any width to suit the ridge which is followed in setting the plants, the wheels traveling at each side of the ridge.

Various changes in the details of our invention will readily suggest themselves to those conversant with agricultural machinery, and we therefore do not limit our invention to those exact details herein described and shown but claim that we may vary the same to any degree and extent within the knowledge of the skilled mechanic.

Having described our invention, what we claim is—

1. In a machine of the class described, the combination with a suitable framework, an endless conveyer chain supported by the framework, cups carried by the conveyer chain, a shovel at the lower end of the conveyer, and plant-gripping wheels at the rear end of the shovel, of means for conveying motion from the axle of the machine to the conveyer, substantially as specified.

2. In a machine of the class described, the combination with a suitable framework, a pivoted conveyer, cups carried thereby, a shovel at the lower end of said conveyer and supported thereby, and a pair of plant gripping and covering wheels, of means for conveying motion to the conveyer, and a lever for raising and lowering the conveyer and parts carried thereby, substantially as specified.

3. In a machine of the class described, the combination with the framework, a pivoted conveyer declining therefrom, a shovel adjustably mounted upon the lower end of the conveyer, plant-embracing wheels adjustably connected with the conveyer in rear of the shovel, of means for raising and lowering the conveyer, shovel and wheels, and means for conveying motion to the conveyer, substantially as specified.

4. In a machine of the class described, the combination with a suitable framework, a cup-carrying conveyer chain, and a shovel at the lower end thereof, of a pair of plant-grasping wheels set at an angle to each other in rear of the shovel, and means for supporting the wheels, substantially as specified.

5. In a machine of the class described, the combination with a suitable framework, a declining conveyer, and a shovel arranged at the lower end thereof, of a pair of adjustably supported wheels arranged in rear of the shovel and at an angle to each other, and wire rings secured to the inner faces of the wheels, substantially as specified.

6. In a machine of the class described, the combination with a suitable framework, a conveyer depending therefrom, a shovel having a central opening supported by said conveyer, and plant-grasping wheels supported in rear of the shovel, of a tank mounted upon the framework, and a hose leading from the tank to the opening in the shovel in front of the plant-grasping wheels, substantially as specified.

7. In a machine of the class described, the combination with a framework having a pair of opposite side-sills provided with openings, bushings located in the openings and extending inwardly beyond the side-sills, a transverse shaft mounted in the bushings, means for rotating the shaft, a conveyer pivoted upon the shaft between the inner ends of the bushing, a shaft at the lower end of the conveyer, sprocket-wheels upon the two shafts, a chain belt connecting said wheels, a cup-carrying apron secured to the belt, and shoulder-bars loosely mounted on the inner ends of the bushings, of extension-bars carried by the shoulder-bars, plant-grasping wheels supported by the extension-bars, and a shovel arranged under the lower end of the conveyer and in advance of the plant-grasping wheels, substantially as specified.

8. In a machine of the class described, the combination with a framework, a declining conveyer, and means for operating the same, of a pair of pivoted shoulder-bars declining from the framework, flared extension-bars pivoted to the shoulder-bars, having their lower ends curved, their upper ends flared, and at their latter ends provided with concentric slots, bolts passed through the slots into the shoulder-bars, boxes provided with spindles and mounted loosely on the lower ends of the extension-bars, wheels carried by the spindles, and means for raising and lowering the shoulder-bars and extension-bars, substantially as specified.

9. In a machine of the class described, the combination with the framework, the inclined conveyer, the series of cups comprising the stationary sections and hinged sections, and the shovel at the lower end of the conveyer, of the plant-grasping and covering wheels in rear of the shovel, and means for giving motion to the conveyer, substantially as specified.

10. In a machine of the class described, the combination with the framework, a cup-carrying conveyer provided with a hopper arranged over the conveyer, a spring-pressed cut-off arranged in the hopper and in the path of the posts, a shovel at the lower end of the conveyer, and combined covering and plant-grasping wheels in rear of the shovel, substantially as specified.

11. In a machine of the class described, the combination with the framework, the inclined conveyer, and means for giving motion to the same, of a shovel located at the lower end of the conveyer, plant-grasping and covering wheels in rear of the shovel, a pair of inclined longitudinally-disposed bars supported above the conveyer, cross-bars intersecting the same, inclined boards at opposite sides of the cross-bars, pivoted cut-offs arranged in the spaces between the longitudinal bars and the sides of the conveyer, said cut-offs having inner inclined edges, springs arranged against the cut-offs for normally closing the same, cups carried by the conveyer, and trip-posts or pins mounted in alternately opposite corners of successive cups, substantially as specified.

12. In a machine of the class described, the combination with the opposite side-sills, the front and rear trucks, standards extending from the side-sills, seats supported by the standards, of intermediate hoppers, a cup carrying conveyer arranged below the same, means for operating the hoppers, a shovel at the lower end of the conveyer, and plant-grasping wheels arranged in rear of the shovel, substantially as specified.

13. In a machine of the class described, the combination with the framework, the declining conveyer, the metal plates at the opposite sides of the conveyer, the angular shovel sections pivoted at their front ends and adjustably connected to the plates, said shovel sections converging toward their front ends and forming an intermediate slot, a stirrup depending from the conveyer and pivoted to the front end of the shovel sections, a pair of slotted extension plates extending rearwardly from the ends of the shovel sections and provided with set-bolts, and plant grasping and covering wheels arranged in rear of the shovels, substantially as specified.

14. In a machine of the class described, the combination with the framework, the conveyer carried thereby and having an endless chain, of a shovel at the lower end of the conveyer, means for operating the chain, and a series of cups arranged upon the chain, each cup consisting of the permanent section 20, the lower foot-section 21, and the intermediate section 22, the latter two being mounted on the chain, substantially as specified.

In testimony that we claim the foregoing as our own we have hereto affixed our signatures in the presence of two witnesses.

CHESTER O. MOORE.
EDSON C. MOORE.
THOMAS J. FITZSIMMONS.

Witnesses:
D. POWELL JOHNSON, Jr.,
J. C. COLLINS.